(12) United States Patent
Jolly et al.

(10) Patent No.: US 7,569,776 B2
(45) Date of Patent: Aug. 4, 2009

(54) INTUMESCENT COVER FOR A POKE-THROUGH ASSEMBLY

(75) Inventors: Robert K. Jolly, Cordova, TN (US); Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 140 days.

(21) Appl. No.: 11/752,987

(22) Filed: May 24, 2007

(65) Prior Publication Data

US 2008/0135286 A1 Jun. 12, 2008

Related U.S. Application Data

(60) Provisional application No. 60/868,945, filed on Dec. 7, 2006.

(51) Int. Cl.
H02G 3/22 (2006.01)
H02G 3/04 (2006.01)
H02G 3/18 (2006.01)

(52) U.S. Cl. .................. 174/483; 174/481; 174/488; 220/3.2; 220/3.3; 52/220.1; 52/220.8

(58) Field of Classification Search ............. 174/480, 174/481, 54, 482, 483, 484, 490, 494, 488; 174/487; 439/650, 535, 652, 138, 142; 52/220.5, 52/220.7, 220.8, 220.1; 220/3.2–3.9, 4.02
See application file for complete search history.

(56) References Cited

U.S. PATENT DOCUMENTS

| | | | | |
|---|---|---|---|---|
| 4,099,020 A | * | 7/1978 | Kohaut | 174/483 |
| 4,336,416 A | * | 6/1982 | Goodsell | 174/483 |
| 5,032,690 A | * | 7/1991 | Bloom | 174/487 |
| 6,175,078 B1 | * | 1/2001 | Bambardekar et al. | 174/484 |
| 6,417,446 B1 | | 7/2002 | Whitehead | |
| 6,495,753 B1 | | 12/2002 | Goodsell et al. | |
| 6,518,498 B1 | * | 2/2003 | Bonilla et al. | 174/484 |
| 6,854,226 B2 | * | 2/2005 | Cole et al. | 52/220.8 |
| 7,166,798 B2 | | 1/2007 | Cole | |
| 7,271,351 B2 | * | 9/2007 | Drane | 174/483 |
| 7,442,883 B2 | * | 10/2008 | Jolly et al. | 174/483 |

OTHER PUBLICATIONS

U.S. Appl. No. 11/752,964, filed May 24, 2007, titled "Intumescent Cover for a Poke-Through Assembly" and assigned to Thomas & Betts International, Inc.

* cited by examiner

*Primary Examiner*—Angel R Estrada
(74) *Attorney, Agent, or Firm*—Hoffmann & Baron, LLP

(57) ABSTRACT

One aspect of the present invention provides a poke-through assembly for installation in a hole in a floor structure. The floor structure defines a floor in a first working environment and a ceiling in a second working environment. The poke-through assembly includes at least one intumescent member and an intumescent cover assembly. The intumescent member being disposed at least partially within the hole in the floor structure. Also, the intumescent cover assembly including a base plate and a retainer member. The base plate supports the intumescent member and the retainer limits and/or restricts expansion of the intumescent member. Further, the retainer is adjustably secured to the base plate in a plurality of positions.

19 Claims, 5 Drawing Sheets

INTUMESCENT COVER FOR A POKE-THROUGH ASSEMBLY

CROSS-REFERENCE TO RELATED APPLICATIONS

This application claims the benefit of U.S. Provisional Patent Application Ser. No. 60/868,945 filed on Dec. 7, 2006.

BACKGROUND OF THE INVENTION

A poke-through assembly or simply a "poke-through" is a common device that enables power, data or other cabling to pass through a hole between floors in a building, generally a concrete floor. A thermal barrier in the form of a fire and/or smoke retardant element, particularly intumescent material, is incorporated within the poke-through. The intumescent serves as a fire-stop and expands to seal any remaining space within the poke-through and the surrounding hole in which it is installed. This helps prevent the spread of fire and/or smoke from one floor to the next.

Contemporary poke-throughs provide access between an upper floor and an immediately adjacent lower floor. The poke-through assembly is usually installed with a cover which serves as a cap or lid for the hole. Also, the poke-through generally includes an upper frame or basket designed to create an easily accessible cavity or recess at the surface of the upper floor. Alternatively, such frames or baskets can be used to hold power and/or data receptacles therein. The upper frame is generally metallic and is in direct contact with a cover plate or the upper flooring itself. A lower end of the contemporary poke-through is connected to a junction box accessible to an adjacent lower floor. The lower end generally has open sides that hold intumescent material. Such an open configuration for the intumescent allows it to fully expand when heated, and theoretically seal the poke-through hole. However, the intumescent material does not generally provide a stable rigid support structure, especially when heated substantially. Thus, the expanding intumescent material will squeeze its way out the bottom of the poke-through assembly and big chunks of the material can break-off. This causes a loss of intumescent material, which can compromise the fire-stop capability for which it was intended.

There is therefore a need for a poke-through assembly that prevents the loss of and/or provides a retainer for the intumescent material. Such an improved assembly must be inexpensive, and manufactured and installed easily. Additionally, it would be beneficial if the improved assembly or at least portions thereof could be retrofit into existing poke-throughs without replacing the entire existing assembly.

SUMMARY OF THE INVENTION

One aspect of the present invention provides a poke-through assembly for installation in a hole in a floor structure. The floor structure defines a floor in a first working environment and a ceiling in a second working environment. The poke-through assembly includes at least one intumescent member and an intumescent cover assembly. The intumescent member being disposed at least partially within the hole in the floor structure. Also, the intumescent cover assembly including a base plate and a retainer member. The base plate supports the intumescent member and the retainer limits and/or or restricts expansion of the intumescent member. Further, the retainer is adjustably secured to the base plate in a plurality of positions.

Another aspect of the present invention provides a poke-through assembly, which includes an upper frame, at least one intumescent member, a base plate, and a cup. The intumescent member being disposed below the upper frame and the base plate supporting the intumescent member. The cup positioned to retain expanded portions of the intumescent member. Also, a vertical position of the cup is adjustable relative to the base plate.

Additionally, the poke-through assembly can include a retainer member or cup that circumferentially surrounds at least a portion of the intumescent member. Also, the retainer member or cup can circumferentially surround substantially the entire intumescent member. Further, each of the adjustably secured retainer or cup positions can correspond to a different amount of the intumescent member being surrounded by the retainer member. Further still, the retainer or cup can include a plurality of apertures for allowing expansion of a portion of the intumescent member through the apertures. Yet further still, the retainer or cup can include a bracket or collar formed thereon for supporting an adjustable fastener, which allows the retainer or cup to be adjustably secured. The bracket or collar can extend from a base portion of the retainer or cup.

The poke-through assembly can further include a conduit fixedly secured to the base plate and adjustably secured to the retainer member or cup. Also, a vertical position of the retainer member or cup can be adjustable relative to the conduit.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

This invention pertains to a poke-through assembly with improved heat isolation features, particularly in the form of a cover assembly for retaining the intumescent material used in a fire-rated electrical poke-through. Also, the features of the present invention are relatively inexpensive, manufactured easily and quickly installed. Additionally, the features of the present invention can be retrofit into existing poke-throughs without replacing the entire assembly.

Figure 1A:
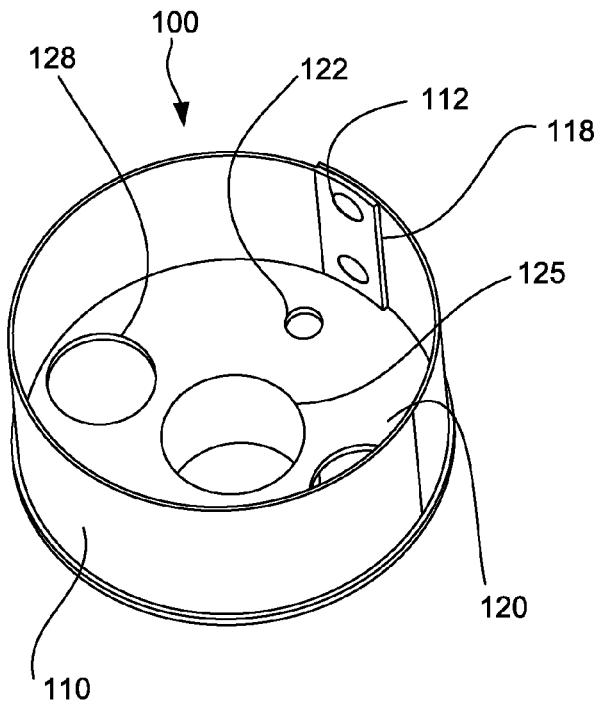
FIGS. 1a and 1b are respectively top and bottom perspective views of one embodiment of a retainer portion of the intumescent cover in accordance with the present invention.
Figure 1B:
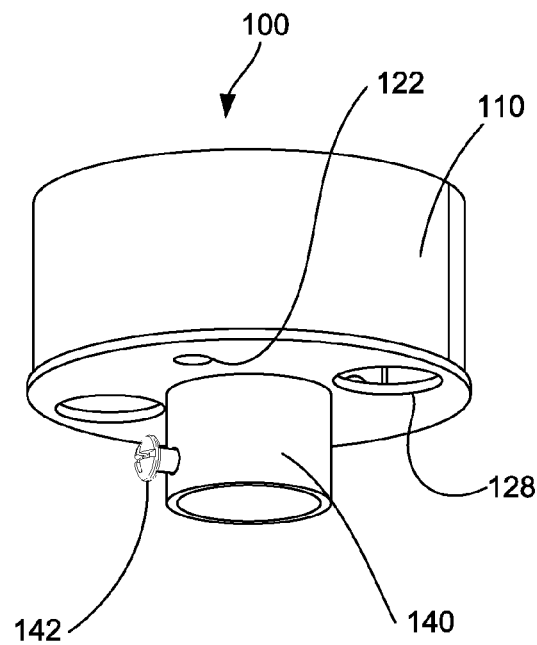

FIGS. 1a and 1b show a first portion of an intumescent cover assembly, namely an intumescent cover, cup or retainer 100, in accordance with one embodiment of the present invention. The retainer 100, preferably includes an annular band 110 that is attached to a lower plate 120. The annular band 110 rises vertically from the lower plate 120, together forming a retainer or cup that can cover the lower portions of the poke-through assembly, and particularly the intumescent material (shown in FIGS. 5-8). When fully assembled in the poke-through, often time neither the band 110 nor the lower plate 120 is in direct contact with the intumescent material.

The band 110 is preferably formed with an overlapping structure 118. The overlap 118 provides a region 112 for spot welding or otherwise securing the two ends of the band 110 to maintain a closed annular form. Also, the band 110 is preferably secured to the lower plate 120. The overlapping structure 118 could alternatively be eliminated, so the annular band 110 has no overlap and thus a constant thickness. Thus, two ends of an otherwise flat band bent to form an annular band could be spot welded or bonded; or the union between the plate 120 and the band 110 could be welded or bonded to maintain the shape and position of the band 110.

Figure 2A:
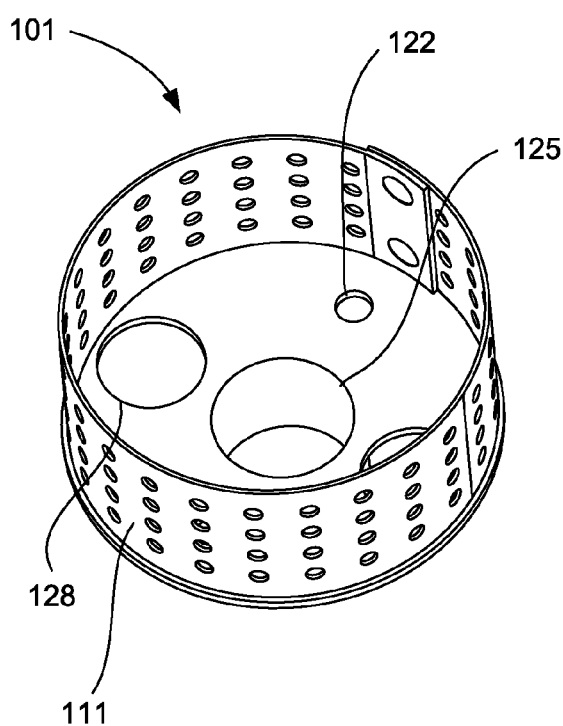
FIGS. 2a and 2b are respectively top and bottom perspective views of another embodiment of a retainer portion of the intumescent cover in accordance with the present invention.
Figure 2B:
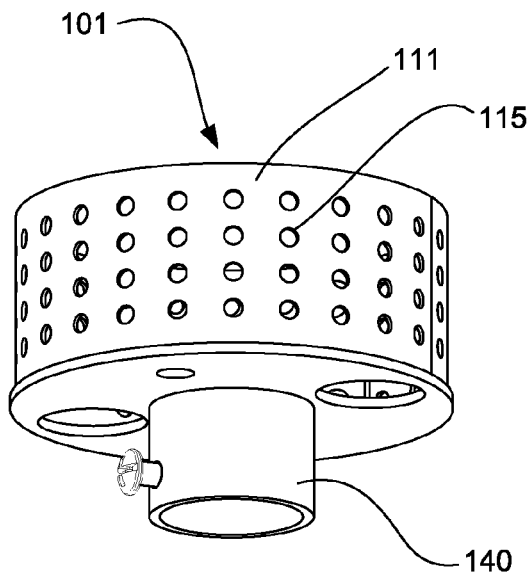

FIGS. 2a and 2b show an intumescent retainer 101, in accordance with an alternative embodiment of the present invention. The annular band 111 preferably includes apertures 115 in the form of holes or perforations, through which intumescent material can expand during a fire. Preferably, the intumescent material while expanding should be able to extrude through or past the apertures 115 and abut the inner side-walls of the poke-through hole. In this way, the band 111 still allows radial expansion of intumescent material which provides a fire stop, but restricts and retains a portion of the material. Also, once the intumescent material expands through the aperture 115, the band 111 acts as a structural reinforcement for the intumescent member(s). This reinforcement can help prevent large chunks of intumescent material from breaking off or away from the overall assembly.

It should be understood that while perforations 115 are shown to be circular almost any shape or size could be provided. Also, the perforations 115 need not be distributed evenly across most of the band 110. For example, the perforations 115 could be provided only on a portion of the band 110, such as near the top rim or bottom portion thereof. Further, the perforations 115 could be larger or smaller than that shown, and they need not all be the same size or shape. Additionally, the band 110 could be formed of a wire mesh, thus increasing the amount of intumescent that can pass therethrough.

Figures 3, 4:
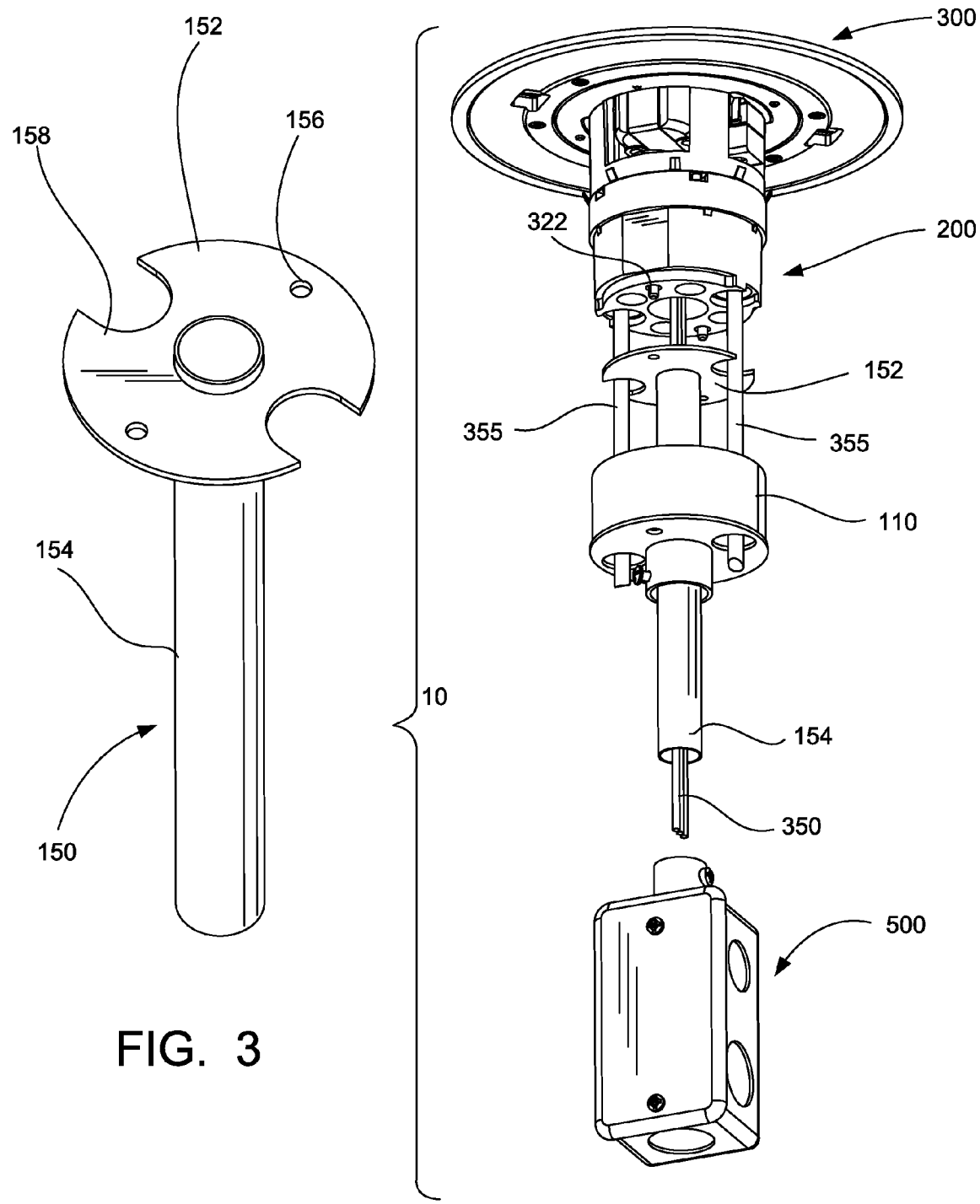
FIG. 3 is a top perspective view of one embodiment of a support member of the intumescent cover in accordance with the present invention.
FIG. 4 is a bottom partially exploded perspective view of a poke-through assembly including an intumescent cover in accordance with the present invention.

FIG. 3 shows a second portion of an intumescent cover assembly, namely an intumescent support member 150. The support member 150 includes a support or base plate 152 that is preferably secured directly below the intumescent member 200. As shown in FIG. 4, apertures 156 can receive a rod or bolt 322 for coupling the support member 150 to the upper receptacle portion 300. An upper surface of the base plate 152 is generally in direct contact with the intumescent member 200, thereby holding it under the upper receptacle portion 300. However, the intumescent member 200 is preferably not rigidly fastened to the support member 150 or any other element in the poke-through assembly. The support member 150 also preferably includes at least one elongate support column or conduit 154 for holding the retainer 100, 101 in a select vertical position relative to the intumescent member 200. As shown in FIG. 3, the conduit 154 is formed as a centrally positioned conduit member for passing power cables 350 therethrough.

With reference to FIGS. 1a, 1b, 2a and 2b, preferably the lower plate 120 includes apertures 122, 125 and 128. The lower plate apertures 122, 125, 128 primarily provide passage for other parts of the assembly. Preferably, those apertures 122, 125 and 128 are sized to limit as much as possible the passage of expanding intumescent material. As shown in FIG. 4, apertures 122 can receive a rod or bolt 322 for coupling the lower plate 120, along with the base plate 152 to the upper receptacle portion 300. In this way, the retainer 100, 101 and base plate 152 are secured to the upper poke-through assembly, holding and/or retaining the intumescent material 200 without being directly secured to it. Additionally, apertures 128 allow the passage therethrough of cables, such as communication cables 355. In contrast, aperture 125 preferably provides passage for power cables 350.

As shown in FIGS. 1b and 2b, the retainer 100, 101 preferably includes a collar 140 for receiving and being mounted on the conduit 154 and securing the retainer 100, 100 in a fixed position thereto. Preferably, a simple fastener 142 is provided, which can be easily adjusted in order to configure the assembly as desired. The aperture 125 is preferably coaxially aligned with the attachment collar 140 for mating with the conduit 154. The conduit 154 preferably communicates with and is coupled to the junction box 500 positioned below, as shown in FIGS. 4-8. Alternatively, rather than being supported by a collar 140, fastener 142 could be supported by a non-annular bracket.

Figure 5:
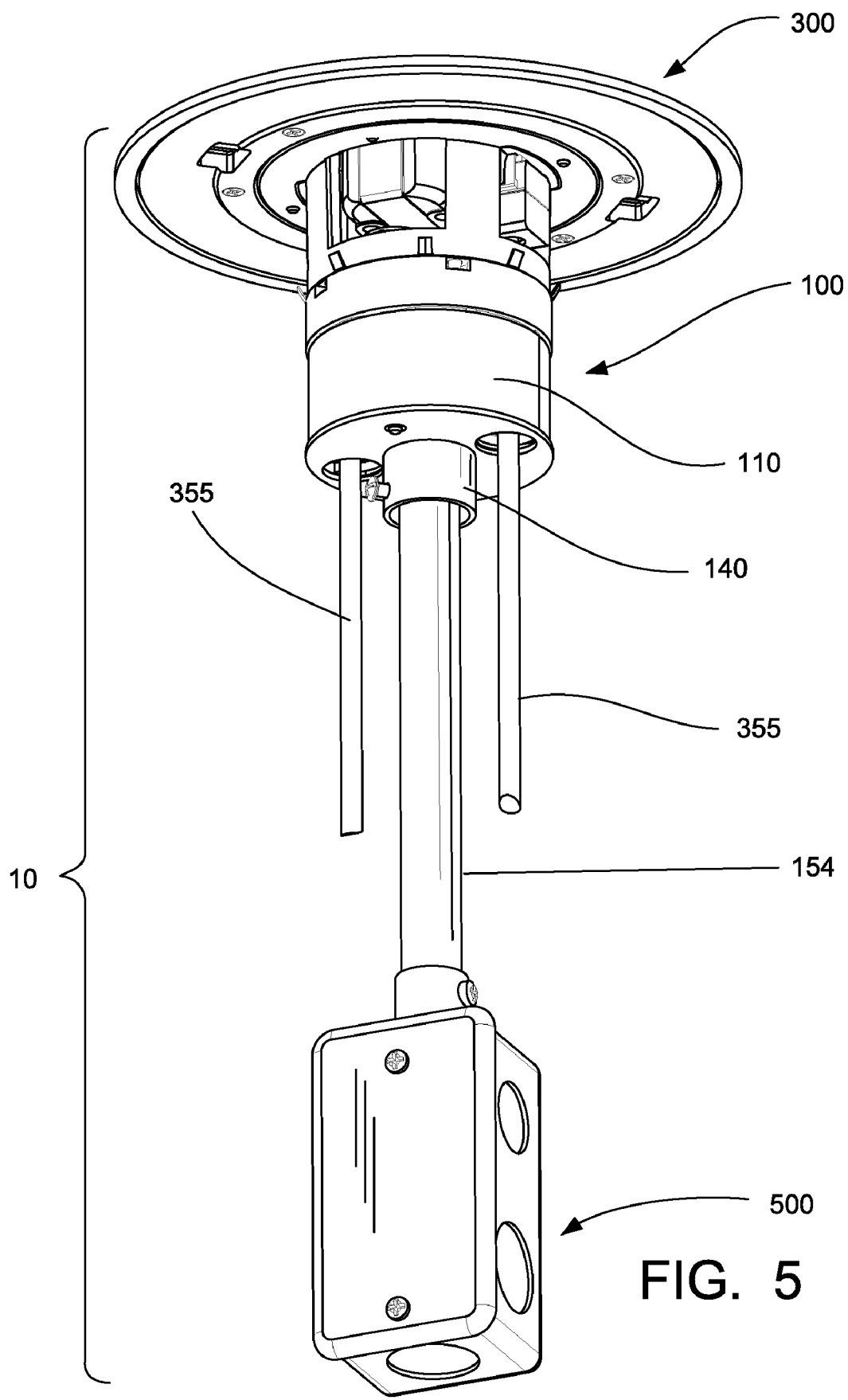
FIG. 5 is a bottom perspective assembled view of the poke-through assembly shown in FIG. 4.
Figures 6, 7:
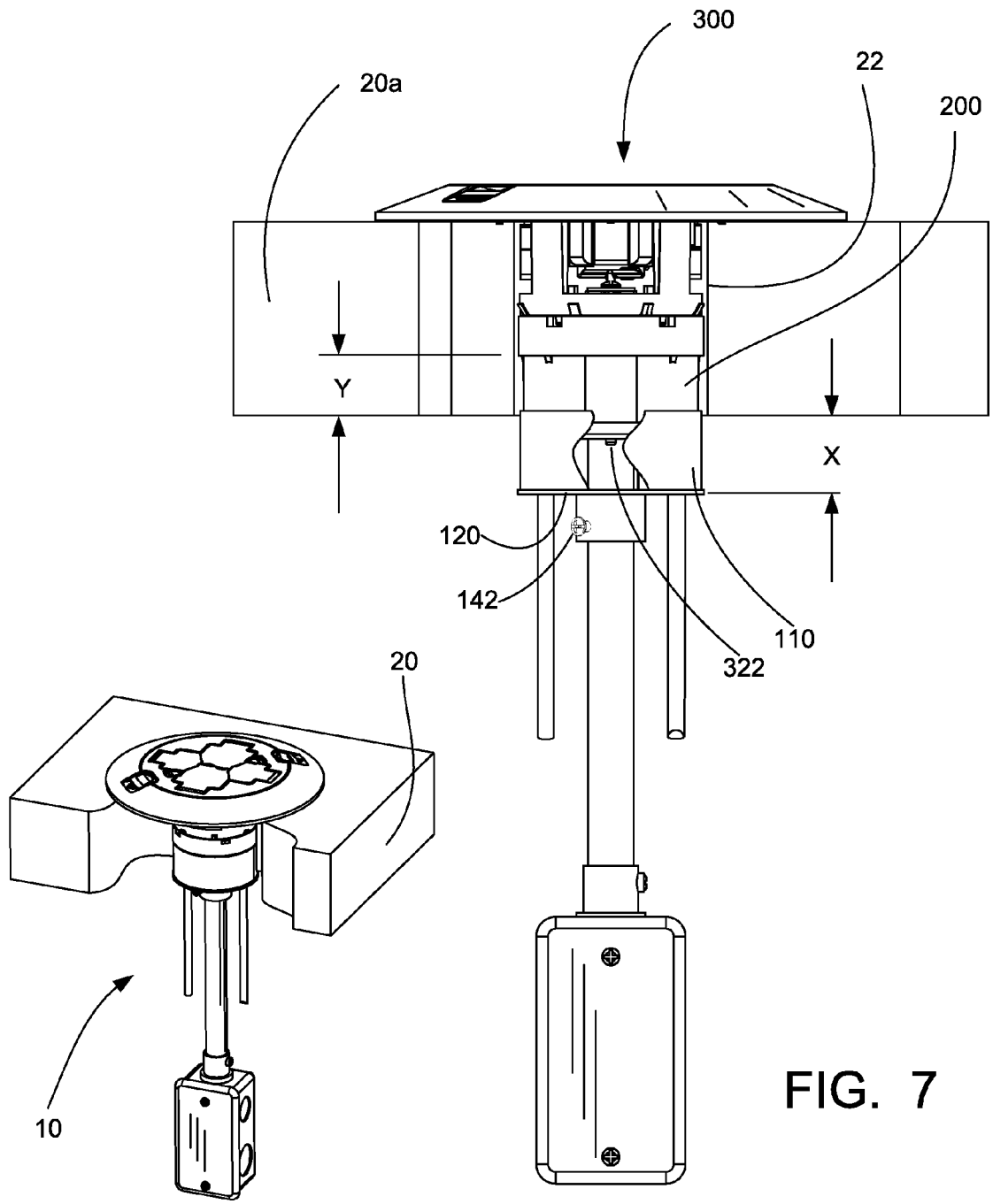
FIG. 6 is a top perspective view of the poke-through assembly shown in FIG. 5 inserted in a concrete slab, with a cutaway of a portion of the slab.
FIG. 7 is a side section view of the poke-through assembly shown in FIG. 4 inserted in a thick concrete slab with the intumescent retainer secured in a lower position.
Figure 8:
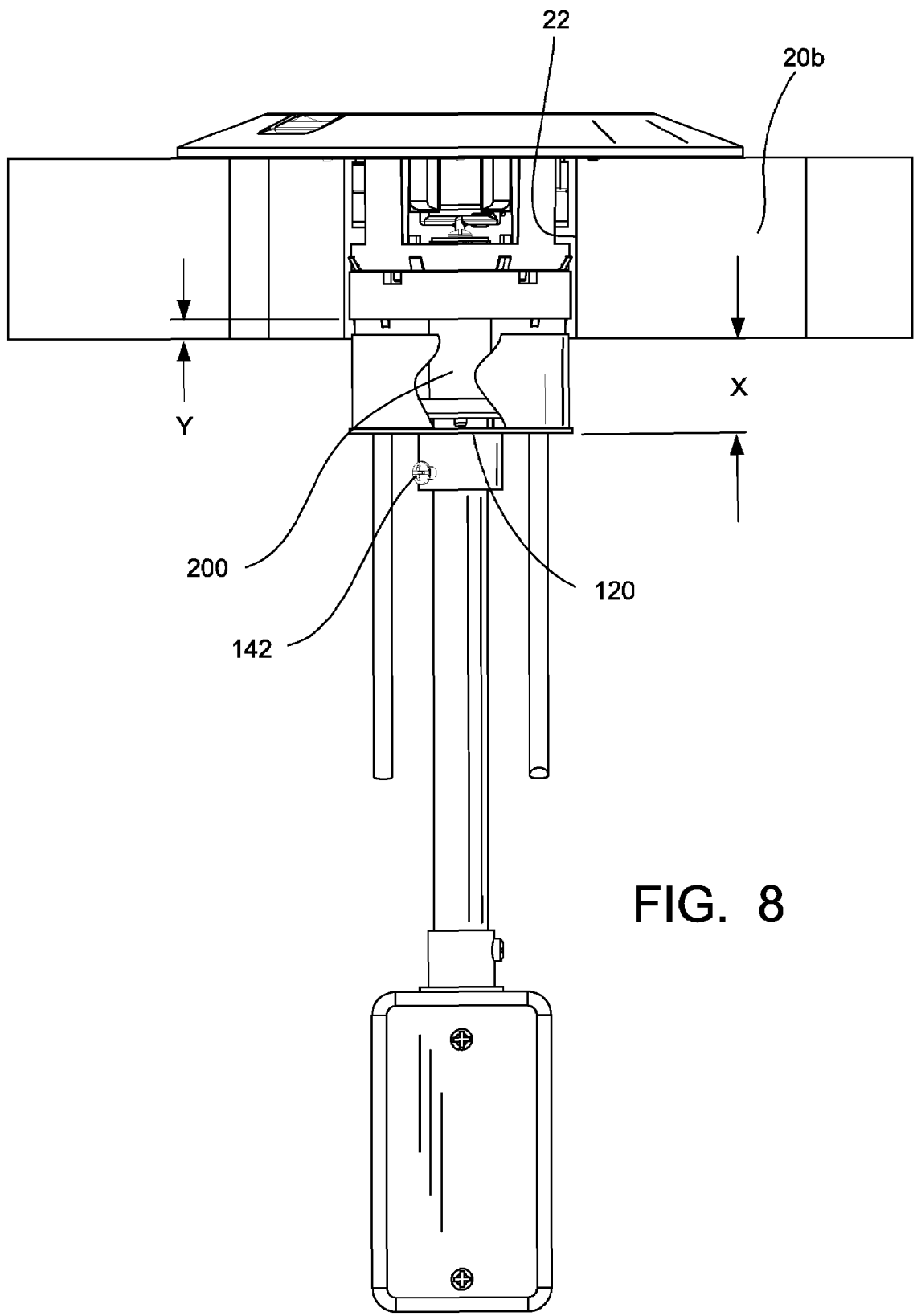
FIG. 8 is a side section view of the poke-through assembly shown in FIG. 4 inserted in a thin concrete slab with the intumescent retainer secured in the highest position.

As shown in FIGS. 5 and 6, the retainer 100 preferably encloses substantially all of the lower and side surfaces of the intumescent material 200. However, alternatively a portion of the intumescent, such as an upper portion, may remain uncovered (as shown in FIGS. 7 and 8). Such an upper gap can function similar to apertures 115, in allow expanding intumescent material to expand beyond the perimeter of the retainer 100. FIG. 6 shows the poke-through assembly 10 installed in a floor structure 20. Similarly, FIGS. 7 and 8 show the contrast between an installation in a first thicker floor 20a and a second thinner floor 20b. It should be understood that the assembly 10 of the present invention could be used in even thinner or thicker floors than that shown. FIGS. 7 and 8 also particularly illustrate advantages and of the present invention and how it can be configured to suit particular circumstances.

As shown in FIG. 7, some installations in thicker floors 20a, provide sufficient space Y within the poke-through hole 22, below the upper receptacle portion 300, to contain all or most of the intumescent member 200. Preferably, the retainer 100 is installed so as to be positioned just below the lower surface of the floor 20a. Thus, an upper lip of annular band 110 sits just inside the hole 22 and the lower plate 120 is positioned a distance X below the lower surface of the floor structure 20a. This configuration provides a significant portion of the side surfaces of intumescent member 200 to be directly exposed to the inner walls of the hole 22. Thus, when and if the intumescent member 200 is heated, it can radially expand and abut the inner walls and provide its fire-stop capabilities. Without the retainer 100 of the present invention, expanding intumescent material 200 would ooze out the bottom of the poke-through assembly 10. Also, even if just a bottom plate where provided without the band 110, intumescent material 200 could squeeze through the gap X and potentially separate from the assembly.

As shown in FIG. 8, occasionally installation in a thinner floor structure 20b will leave the intumescent material 200 protruding from the bottom of the hole 22. In a configuration as shown in FIG. 8, without retainer 100 even a minor loss of intumescent material 200 could mean it no longer engages the side walls of the hole 22, thus reducing the sealing and/or fire-stop capability of the assembly. According, the retainer can be mounted with its base 120 closer to the base plate 152, once again leaving the upper lip of annular band 110 sitting just inside hole 22. This configuration will still "catch" much of the expanding intumescent material 200 and control or guide its release (expansion).

While the retainer 100 shown forms a cup-like member, with various openings and cutouts, it should be understood that this element could have many variations known in the art. Additionally, while the retainer 100 can be made of various materials, it is preferably made of stainless steel, die-cast zinc or aluminum.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A poke-through assembly for installation in a hole in a floor structure, said floor structure defining a floor in a first working environment and a ceiling in a second working environment, said poke-through assembly comprising:
    at least one intumescent member disposed at least partially within said hole in said floor structure; and
    an intumescent cover assembly, said cover assembly including a
        base plate supporting said at least one intumescent member, and a retainer member for retaining expanded portions of said intumescent member, said retainer member being adjustably secured to said base plate in a plurality of positions wherein said retaining member includes a bracket formed thereon, said bracket supporting a fastener for said adjustable securing of said retainer member.

2. The poke-through assembly as set forth in claim 1, wherein said retainer member circumferentially surrounds at least a portion of the intumescent member.

3. The poke-through assembly as set forth in claim 2, wherein said retainer member circumferentially surrounds substantially the entire intumescent member.

4. The poke-through assembly as set forth in claim 1, wherein each of said positions corresponds to a different amount of said intumescent member being surrounded by said retainer member.

5. The poke-through assembly as set forth in claim 1, wherein said retainer includes a plurality of apertures for allowing expansion of a portion of said intumescent member through said apertures.

6. The poke-through assembly as set forth in claim 1, wherein said intumescent cover assembly further includes conduit, wherein said conduit is fixedly secured to said base plate and adjustably secured to said retainer member.

7. The poke-through assembly as set forth in claim 6, wherein a vertical position of said retainer member is adjustable relative to said conduit.

8. The poke-through assembly as set forth in claim 1, wherein said bracket is formed by an annular collar extending from a base of said retainer member.

9. A poke-through assembly for installation in a hole in a floor structure, said floor structure defining a floor in a first working environment and a ceiling in a second working environment, said poke-through assembly comprising:
    an upper frame;
    at least one intumescent member disposed below said upper frame;
    a base plate for supporting said at least one intumescent member; and
    a cup for retaining expanded portions of said intumescent member, wherein a vertical position of said cup is adjustable relative to said base plate wherein said cup includes a bracket formed thereon, said bracket supporting a fastener for adjustably securing said cup.

10. The poke-through assembly as set forth in claim 9, wherein said cup circumferentially surrounds at least a portion of said intumescent member.

11. The poke-through assembly as set forth in claim 9, wherein said cup circumferentially surrounds substantially the entire intumescent member.

12. The poke-through assembly as set forth in claim 9, wherein adjustment of said vertical position corresponds to a different amount of said intumescent member being surrounded by said cup.

13. The poke-through assembly as set forth in claim 9, further comprising:
    a conduit fixedly secured to said base plate and adjustably secured to said cup.

14. The poke-through assembly as set forth in claim 13, wherein a vertical position of said cup is adjustable relative to said conduit.

15. A poke-through assembly for installation in a hole in a floor structure, said floor structure defining a floor in a first working environment and a ceiling in a second working environment, said poke-through assembly comprising:
    an upper frame;
    at least one intumescent member disposed below said upper frame;
    a base plate for supporting said at least one intumescent member; and
    a cup for retaining expanded portions of said intumescent member, wherein a vertical position of said cup is adjustable relative to said base plate, wherein said cup includes a plurality of apertures for allowing expansion of a portion of said intumescent member through said apertures.

16. The poke-through assembly as set forth in claim 15, wherein said cup circumferentially surrounds at least a portion of said intumescent member.

17. The poke-through assembly as set forth in claim 15, wherein said cup circumferentially surrounds substantially the entire intumescent member.

18. The poke-through assembly as set forth in claim 15, wherein adjustment of said vertical position corresponds to a different amount of said intumescent member being surrounded by said cup.

19. The poke-through assembly as set forth in claim 15, further comprising:
    a conduit fixedly secured to said base plate and adjustably secured to said cup.

* * * * *